(12) United States Patent
Wang et al.

(10) Patent No.: US 12,496,428 B2
(45) Date of Patent: Dec. 16, 2025

(54) IMAGING CATHETER, TIP, TUBE BODY AND MEDICAL DEVICE

(71) Applicant: MICRO-TECH (NANJING) CO., LTD., Jiangsu (CN)

(72) Inventors: Jiwei Wang, Jiangsu (CN); Xiaochun Li, Jiangsu (CN); Duangui Gao, Jiangsu (CN)

(73) Assignee: MICRO-TECH (NANJING) CO., LTD., Nanjing (CN)

( * ) Notice: Subject to any disclaimer, the term of this patent is extended or adjusted under 35 U.S.C. 154(b) by 645 days.

(21) Appl. No.: 17/819,922

(22) Filed: Aug. 15, 2022

(65) Prior Publication Data

US 2022/0386991 A1 Dec. 8, 2022

Related U.S. Application Data

(63) Continuation of application No. PCT/CN2021/075594, filed on Feb. 5, 2021.

(30) Foreign Application Priority Data

Mar. 4, 2020 (CN) .......................... 202010144399.6

(51) Int. Cl.
*A61M 25/00* (2006.01)

(52) U.S. Cl.
CPC .... *A61M 25/0023* (2013.01); *A61M 25/0082* (2013.01)

(58) Field of Classification Search
CPC ... A61B 1/005; A61B 1/00071; A61B 1/0008; A61B 1/0011; A61B 1/012; A61B 1/018;
(Continued)

(56) References Cited

U.S. PATENT DOCUMENTS

| 5,259,366 A | 11/1993 | Reydel et al. |
| 2013/0172677 A1 | 7/2013 | Kennedy et al. |

(Continued)

FOREIGN PATENT DOCUMENTS

| CN | 101669811 A | 3/2010 |
| CN | 202313231 U | 7/2012 |

(Continued)

OTHER PUBLICATIONS

Office Action of Chinese Patent Application No. 202010144399.6 Mailed Jul. 8, 2024.
(Continued)

*Primary Examiner* — Alexandra L Newton
(74) *Attorney, Agent, or Firm* — Kilpatrick Townsend & Stockton LLP

(57) ABSTRACT

An imaging catheter, a tip, a tube body and a medical device, relating to the field of medical instruments, where the imaging catheter includes a tube body and a tip, the tube body includes a first shuttling wall and a second shuttling wall, a first lumen is formed between the first shuttling wall and the second shuttling wall, the tip includes a first mounting wall and a second mounting wall, and a second lumen is formed between the first mounting wall and the second mounting wall. The second lumen is communicated with the first lumen, and a proximal end of the first mounting wall corresponds between the first shuttling wall and the second shuttling wall. A radial distance between a point m and a point n is a, and an inner diameter of the first lumen is b, where $a \geq b$.

19 Claims, 8 Drawing Sheets

(58) Field of Classification Search
CPC .......... G02B 23/2476; A61M 25/0082; A61M 2025/0037; A61M 2025/0034; A61M 2025/0035
See application file for complete search history.

(56) References Cited

U.S. PATENT DOCUMENTS

| | | | |
|---|---|---|---|
| 2017/0127920 | A1 | 5/2017 | Morimoto |
| 2019/0357751 | A1* | 11/2019 | Friedlander ............ A61B 1/015 |
| 2020/0405137 | A1* | 12/2020 | Sørensen ................ A61B 1/008 |

FOREIGN PATENT DOCUMENTS

| | | |
|---|---|---|
| CN | 208464031 U | 2/2019 |
| CN | 109907782 A | 6/2019 |
| CN | 209770315 U | 12/2019 |
| CN | 211834300 U | 11/2020 |
| JP | H07308286 A | 11/1995 |
| JP | H09238893 A | 9/1997 |
| JP | 2010063795 A | 3/2010 |
| JP | 2017086399 A | 5/2017 |
| WO | 2019126676 A1 | 6/2019 |

OTHER PUBLICATIONS

The extended European search report mailed in European Application 21764921.9, mailed on Jun. 5, 2023.
The Notice of Reasons for Refusal received in the counterpart Japanese Application 2022-550200, mailed on Oct. 3, 2023.
International Search Report and Written Opinion mailed in International Application PCT/CN2021/075594 on Apr. 30, 2021.

* cited by examiner

A-A

B-B

C-C

IMAGING CATHETER, TIP, TUBE BODY AND MEDICAL DEVICE

CROSS-REFERENCE TO RELATED APPLICATIONS

This application is a continuation of International Application No. PCT/CN2021/075594, filed on Feb. 5, 2021, which claims priority to Chinese Patent Application No. 202010144399.6, filed on Mar. 4, 2020, both of which are hereby incorporated by reference in their entireties.

TECHNICAL FIELD

The present disclosure relates to the field of medical instruments, and in particular, to an imaging catheter, a tip, a tube body and a medical device.

BACKGROUND

The direct-viewing choledochoscope system through duodenal endoscope is gradually recognized by the market. Studies have shown that the choledochoscope system does not lead to increase in incidence of complications compared with ERCP, which further confirms safety of choledochoscope system. Compared with the traditional ERCP surgery, the choledochoscope system observes lesions and stones in a biliary tract through its own camera, which greatly improves the accuracy of treatment of biliary tract diseases. In clinical use, the choledochoscope system can be used in conjunction with a surgical instrument through its working lumen to perform a surgical treatment. However, there are few types of existing working lumens compatible with the surgical instrument.

SUMMARY

An object of the present disclosure includes, for example, providing an imaging catheter that can effectively improve the above-mentioned technical problem.

An object of the present disclosure includes, for example, providing a tip that can effectively improve the above-mentioned technical problem.

An object of the present disclosure includes, for example, providing a tube body that can effectively improve the above-mentioned technical problem.

An object of the present disclosure also includes, for example, providing a medical device including the above-mentioned imaging catheter, or the above-mentioned tip, or the above-mentioned tube body.

Embodiments of the present disclosure can be implemented as follows:

The embodiments of the present disclosure provide an imaging catheter, including a tube body and a tip, where the tube body includes a first shuttling wall and a second shuttling wall, the first shuttling wall and the second shuttling wall are distributed along a radial direction of the tube body, and a first lumen is formed between the first shuttling wall and the second shuttling wall;

the tip includes a first mounting wall and a second mounting wall, where the first mounting wall and the second mounting wall are distributed along a radial direction of the tip, and a second lumen is formed between the first mounting wall and the second mounting wall;

a proximal end of the first mounting wall and a proximal end of the second mounting wall are configured to be butted with a distal end of the first shuttling wall and a distal end of the second shuttling wall, respectively, so as to enable the second lumen to be communicated with the first lumen, and the proximal end of the first mounting wall corresponds between the first shuttling wall and the second shuttling wall, such that there is a drop between the proximal end of the first mounting wall and the distal end of the first shuttling wall;

a radial distance between point m and point n is a, and an inner diameter of the first lumen is b, where a≥b, to eliminate the drop, so as to enable an instrument to enter the second lumen from the first lumen;

where the point m is a proximal end point of the first mounting wall, the point n is a point at the proximal end of the second mounting wall or the distal end of the second shuttling wall, and the point n is close to a proximal end of the tube body relative to the point m along an axial direction of the tube body.

In an implementation, a proximal end face of the first mounting wall is aligned with a proximal end face of the second mounting wall along an axial direction of the tip, a distal end face of the first shuttling wall is aligned with a distal end face of the second shuttling wall along the axial direction of the tube body, and the axial direction of the tube body is in the same direction as the axial direction of the tip.

In an implementation, the proximal end of the second mounting wall is provided with a first notch connected with the second lumen, the distal end of the second shuttling wall is provided with a second notch communicated with the first lumen, a proximal end of the first notch is communicated with a distal end of the second notch, and the point n is located in an area corresponding to the second notch.

In an implementation, the tip includes a main body and an extended portion, a distal end of the extended portion is connected to a proximal end of the main body, a proximal end of the extended portion is connected to a distal end of the tube body, an outer diameter of the extended portion is smaller than an outer diameter of the main body, such that a stepped structure is formed between the extended portion and the main body;

the second lumen passes through both the extended portion and the body, and the proximal end of the first mounting wall, the proximal end of the second mounting wall and the first notch are all arranged on the extended portion.

In an implementation, the second mounting wall includes a transition wall, a distal end of the tip has an outlet configured to allow the instrument to pass out of the second lumen, a proximal end of the transition wall extends to a distal end of the first notch, a distal end of the transition wall extends to the outlet, and the transition wall is configured to change a moving direction of the instrument such that the instrument passes out of the outlet.

In an implementation, the imaging catheter further includes a fixing ring, a distal end of the fixing ring is sleeved around an outer wall of a proximal end of the tip, and a proximal end of the fixing ring is sleeved around an outer wall of the distal end of the tube body, such that the tube body and the tip are relatively fixed, and the fixing ring is configured to close the first notch and the second notch.

In an implementation, a guide surface is arranged on a wall surface of the proximal end of the first mounting wall, the guide surface is configured to guide the instrument passed out of the first lumen into the second lumen.

In an implementation, a graph of the guide surface intercepted by a reference plane is a first straight line inclined relative to a central axis of the tip, and a radial distance from the first straight line to the second mounting wall gradually decreases along a direction from a proximal end of the first straight line to a distal end of the first straight line, where the reference plane is a plane passing through the central axis.

In an implementation, the distal end of the tip has an outlet configured to allow the instrument to pass out of the second lumen, a graph of an outer contour of the outlet intercepted by the reference plane is a second straight line or an arc line inclined relative to the central axis, an inclined direction of the second straight line or the arc line relative to the central axis is opposite to an inclined direction of the first straight line relative to the central axis, and the guide surface is configured to guide the instrument located in the second lumen to pass out of the outlet.

In an implementation, a proximal end point of the guide surface coincides with the proximal end point of the first mounting wall.

In an implementation, the tube body includes a single-lumen tube and a metal mesh tube, and the multi-lumen tube is sheathed within the metal mesh tube.

In an implementation, the tube body further includes a third shuttling wall and a fourth shuttling wall, the first shuttling wall, the second shuttling wall, the third shuttling wall and the fourth shuttling wall are distributed along the radial direction of the tube body, and a third lumen is formed between the third shuttling wall and the fourth shuttling wall;

the tip further includes a third mounting wall and a fourth mounting wall, the first mounting wall, the second mounting wall, the third mounting wall and the fourth mounting wall are distributed along the radial direction of the tip, and a fourth lumen is formed between the third mounting wall and the fourth mounting wall;

a proximal end of the third mounting wall is configured to be butted with a distal end of the third shuttling wall, and a proximal end of the fourth mounting wall is configured to be butted with a distal end of the fourth shuttling wall, such that the fourth lumen is communicated with the third lumen;

where an inner diameter of the fourth lumen is larger than an inner diameter of the third lumen, such that both the proximal end of the fourth mounting wall and the proximal end of the first mounting wall correspond between the first shuttling wall and the second shuttling wall.

In an implementation, the imaging catheter further includes a camera and a wire, where the camera is mounted within the fourth lumen, and the wire is configured to pass through the third lumen and the fourth lumen, and is connected with the camera.

The embodiments of the present disclosure provide a tip configured to be assembled with a tube body, the tube body includes a first shuttling wall and a second shuttling wall, the first shuttling wall and the second shuttling wall are distributed along a radial direction of the tube body, and a first lumen is formed between the first shuttling wall and the second shuttling wall; the tip includes a first mounting wall and a second mounting wall, the first mounting wall and the second mounting wall are distributed along a radial direction of the tip, and a second lumen is formed between the first mounting wall and the second mounting wall;

a proximal end of the first mounting wall and a proximal end of the second mounting wall are configured to be butted with a distal end of the first shuttling wall and a distal end of the second shuttling wall, respectively, so as to enable the second lumen to be communicated with the first lumen, and the proximal end of the first mounting wall is configured to correspond between the first shuttling wall and the second shuttling wall, such that there is a drop between the proximal end of the first mounting wall and the distal end of the first shuttling wall;

a radial distance between point s and point t is c, and an inner diameter of the first lumen is d, where c≥d, to eliminate the drop, so as to enable an instrument to enter the second lumen from the first lumen;

where the point s is a proximal end point of the first mounting wall, the point t is a proximal end point of the second mounting wall, and the point s is close to a distal end of the tip relative to the point t along an axial direction of the tip.

In an implementation, the proximal end of the second mounting wall is provided with a first notch communicated with the second lumen, the first notch is configured to face towards the second shuttling wall, so as to enable the first notch to be communicated with the first lumen, and the point t is located in an area corresponding to the first notch.

In an implementation, the tip includes a main body and an extended portion, a distal end of the extended portion is connected to a proximal end of the main body, a proximal end of the extended portion is configured to be connected to a distal end of the tube body, an outer diameter of the extended portion is smaller than an outer diameter of the main body, such that a stepped structure is formed between the extended portion and the main body;

the second lumen passes through both the extended portion and the main body, and the proximal end of the first mounting wall, the proximal end of the second mounting wall and the first notch are all arranged on the extended portion.

In an implementation, a distal end of the first notch extends to the main body such that the distal end of the first notch corresponds to the second lumen, and a proximal end of the first notch is configured to correspond to the first lumen.

In an implementation, the second mounting wall includes a transition wall, the distal end of the tip has an outlet configured to allow the instrument to pass out of the second lumen, a proximal end of the transition wall extends to the distal end of the first notch, a distal end of the transition wall extends to the outlet, and the transition wall is configured to change a moving direction of the instrument such that the instrument passes out of the outlet.

In an implementation, a guide surface is arranged on a wall surface of the proximal end of the first mounting wall, the guide surface is configured to guide the instrument passed out of the first lumen into the second lumen.

In an implementation, a graph of the guide surface intercepted by a reference plane is a first straight line inclined relative to a central axis of the tip, and a radial distance from the first straight line to the second mounting wall gradually decreases along a direction from a proximal end of the first straight line to a distal end of the first straight line, where the reference plane is a plane passing through the central axis.

In an implementation, a distal end of the tip has an outlet configured to allow the instrument to pass out of the second lumen, a graph of an outer contour of the outlet intercepted by the reference plane is a second straight line or an arc line inclined relative to the central axis, an inclined direction of the second straight line or the arc line relative to the central axis is opposite to an inclined direction of the first straight line relative to the central axis, and the guide surface is configured to guide the instrument located in the second lumen to pass out of the outlet.

In an implementation, a proximal end point of the guide surface coincides with the proximal end point of the first mounting wall.

In an implementation, the tube body further includes a third shuttling wall and a fourth shuttling wall, the first shuttling wall, the second shuttling wall, the third shuttling wall and the fourth shuttling wall are distributed along the radial direction of the tube body, and a third lumen is formed between the third shuttling wall and the fourth shuttling wall;

the tip further includes a third mounting wall and a fourth mounting wall, the first mounting wall, the second mounting wall, the third mounting wall and the fourth mounting wall are distributed along the radial direction of the tip, and a fourth lumen is formed between the third mounting wall and the fourth mounting wall;

a proximal end of the third mounting wall is configured to be butted with a distal end of the third shuttling wall, and a proximal end of the fourth mounting wall is configured to be butted with a distal end of the fourth shuttling wall, such that the fourth lumen is communicated with the third lumen;

where an inner diameter of the fourth lumen is larger than an inner diameter of the third lumen, such that both the proximal end of the fourth mounting wall and the proximal end of the first mounting wall correspond between the first shuttling wall and the second shuttling wall.

The embodiments of the present disclosure provide a tube body configured to be assembled with a tip, the tip includes a first mounting wall and a second mounting wall, the first mounting wall and the second mounting wall are distributed along a radial direction of the tip, and a second lumen is formed between the first mounting wall and the second mounting wall; the tube body includes a first shuttling wall and a second shuttling wall, the first shuttling wall and the second shuttling wall are distributed along a radial direction of the tube body, and a first lumen is formed between the first shuttling wall and the second shuttling wall;

a distal end of the first shuttling wall and a distal end of the second shuttling wall are configured to be butted with a proximal end of the first mounting wall and a proximal end of the second mounting wall, respectively, so as to enable the first lumen to be communicated with the second lumen, and the proximal end of the first mounting wall is configured to correspond between the first shuttling wall and the second shuttling wall, such that there is a drop between the proximal end of the first mounting wall and the distal end of the first shuttling wall;

a distance between point x and point y is e, and an inner diameter of the first lumen is f, where to e≥f, eliminate the drop, so as to enable an instrument to enter the second lumen from the first lumen;

where the point x is a proximal end point of the first mounting wall, the point y is a distal end point of the second shuttling wall, and the point y is close to a proximal end of the tube body relative to the point x along the axial direction of the tube body.

In an implementation, the distal end of the second shuttling wall is provided with a second notch communicated with the first lumen, the second notch is configured to face towards the first mounting wall, so as to enable the second notch to be communicated with the second lumen, and the point y is located in an area corresponding to the second notch.

In an implementation, the tube body includes a metal mesh tube and a multi-lumen tube, and the multi-lumen tube is sheathed within the metal mesh tube.

In an implementation, a distal end of the multi-lumen tube extends out of a distal end of the single-lumen tube.

In an implementation, the tip further includes a third mounting wall and a fourth mounting wall, the first mounting wall, the second mounting wall, the third mounting wall and the fourth mounting wall are distributed along the radial direction of the tip, and a fourth lumen is formed between the third mounting wall and the fourth mounting wall;

the tube body further includes a third shuttling wall and a fourth shuttling wall, the first shuttling wall, the second shuttling wall, the third shuttling wall and the fourth shuttling wall are distributed along the radial direction of the tube body, and a third lumen is formed between the third shuttling wall and the fourth shuttling wall;

a distal end of the third shuttling wall is configured to be butted with a proximal end of the third mounting wall, and a distal end of the fourth shuttling wall is configured to be butted with a proximal end of the fourth mounting wall, such that the third lumen is communicated with the fourth lumen;

where an inner diameter of the third lumen is smaller than an inner diameter of the fourth lumen, such that both the proximal end of the fourth mounting wall and the proximal end of the first mounting wall correspond between the first shuttling wall and the second shuttling wall.

The embodiments of the present disclosure provide a medical device, including the imaging catheter according to any one of the preceding embodiments, or the tip according to any one of the preceding embodiments, or the tube body according to any one of the preceding embodiments, where both the tube body and the tip are sheathed within a channel of the endoscope.

The beneficial effects of the imaging catheter, the tip, the tube body and the medical device of the embodiments of the present disclosure include, for example as described below.

The embodiments of the present disclosure further provide an imaging catheter, where the first lumen is communicated with the second lumen, and at the same time, a radial distance between the point m and the point n is greater than or equal to an inner diameter of the first lumen, such that an instrument that has an outer diameter same as the inner diameter of the first lumen can also enter the second lumen from the first lumen, and a drop between the first mounting wall and the first shuttling wall can be eliminated. In this way, the imaging catheter can be compatible with an instrument with a larger outer diameter, that is, the imaging catheter can be compatible with instruments with a larger range of outer diameters, such that a wider variety of instruments can enter the second lumen from the first lumen.

The embodiments of the present disclosure provide a tip, where the tip is configured such that after the tip is matched with the tube body, the first lumen is communicated with the second lumen, and at the same time, a radial distance between the point s and the point t is greater than or equal to an inner diameter of the first lumen, such that instrument that has an outer diameter same as the inner diameter of the first lumen can also enter the second lumen from the first lumen, and a drop between the first mounting wall and the first shuttling wall can be eliminated. In this way, after using the tip to match with the tube body, it is possible to be compatible with an instrument with a larger outer diameter, that is, it is possible to be compatible with instruments with a larger range of outer diameters, such that a wider variety of instruments can enter the second lumen from the first lumen.

The embodiments of the present disclosure further provide a tube body, where the tube body is configured such that after the tube body is matched with the tip, the first lumen is communicated with the second lumen, and at the same time, a distance between the point x and the point y is greater than or equal to an inner diameter of the first lumen, such that an instrument that has an outer diameter same as the inner diameter of the first lumen can also enter the second lumen from the first lumen, and a drop between the first mounting wall and the first shuttling wall can be eliminated. In this way, after using the tube body to match with the tip, it is possible to be compatible with an instrument that has a larger outer diameter, that is, it is possible to be compatible with instruments with a larger range of outer diameters, such that a wider variety of instruments can enter the second lumen from the first lumen.

The embodiments of the present disclosure further provide a medical device, including the above-mentioned imaging catheter, or the above-mentioned tip, or the above-mentioned tube body, where the medical device can be compatible with instruments with a larger outer diameter, such that a wider variety of instruments can enter the second lumen from the first lumen.

BRIEF DESCRIPTION OF THE DRAWINGS

In order to illustrate the technical solutions of the embodiments of the present disclosure more clearly, the accompanying drawings that need to be used in the embodiments will be briefly introduced below. It should be understood that the following drawings only show some embodiments of the present disclosure, and thus should not be regarded as a limitation of the scope. For those skilled in the art, other related drawings can also be obtained according to these drawings without any creative effort.

Figure 1:
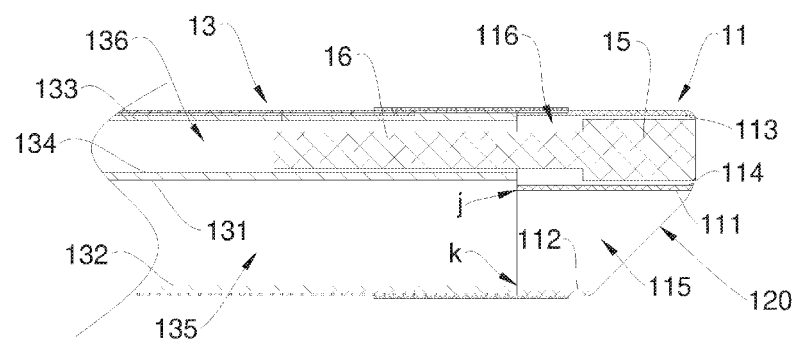
FIG. 1 is a structural schematic diagram of an imaging catheter in the related art according to an embodiment of the present disclosure.

Reference numerals: 1—imaging catheter; 11—tip; 111—first mounting wall; 112—second mounting wall; 1121—transition wall; 113—third mounting wall; 114—fourth mounting wall; 115—second lumen; 116—fourth lumen; 117—first notch; 118—main body; 119—extended portion; 120—outlet; 121—guide surface; 122—fifth lumen; 123—sixth lumen; 13—tube body; 131—first shuttling wall; 132—second shuttling wall; 133—third shuttling wall; 134—fourth shuttling wall; 135—first lumen; 136—third lumen; 137—second notch; 138—metal mesh tube; 139—multi-lumen tube; 140—metal mesh; 141—seventh lumen; 142—eighth lumen; 15—camera; 16—wire; 17—fixing ring; 3—instrument.

DESCRIPTION OF EMBODIMENTS

In order to make the objects, technical solutions and advantages of the embodiments of the present disclosure clearer, the technical solutions in the embodiments of the present disclosure will be clearly and completely described below with reference to the drawings in the embodiments of the present disclosure. Obviously, the described embodiments are part of the embodiments of the present disclosure, rather than all of the embodiments. The components of the embodiments of the present disclosure generally described and illustrated in the drawings herein may be arranged and designed in a variety of different configurations.

Therefore, the following detailed description of the embodiments of the present disclosure provided in the accompanying drawings is not intended to limit the claimed scope of the present disclosure, but is merely representative of selected embodiments of the present disclosure. Based on the embodiments in the present disclosure, all other embodiments obtained by those of ordinary skill in the art without creative labor belong to the protection scope of the present disclosure.

It should be noted that like numerals and letters refer to like items in the following drawings, so once an item is defined in one drawing, it does not require further definition and explanation in subsequent drawings.

In the description of the present disclosure, it should be noted that the orientation or positional relationship indicated by the terms "upper", "lower", "inner" and/or "outer", etc., is based on the orientation or positional relationship shown in the accompanying drawings, or the orientation or positional relationship that the product of the disclosure is usually placed in use, which is only for the convenience of describing the present disclosure and simplifying the description, rather than indicating or implying that the device or element referred to must have a specific orientation or must be constructed and operated in a specific orientation, and therefore should not be construed as limiting the present disclosure.

In addition, where the terms "first" and/or "second" etc. appear, they are only used to differentiate the description, and should not be construed as indicating or implying relative importance.

It should be noted that the features in the embodiments of the present disclosure may be combined with each other without conflict.

In the related art, the imaging catheter shuttles in the channel of the endoscope, the imaging catheter can observe lesions and stones in a biliary tract through its own camera, and surgical instrument can shuttle in the working lumen of the imaging catheter, and the staff can operate the surgical instrument correspondingly according to images taken by the camera to perform surgical treatment.

Please refer to FIG. 1, specifically, the imaging catheter includes a tube body 13, a tip 11, a camera 15 and a wire 16, the tube body 13 includes a first shuffling wall 131, a second shuffling wall 132, a third shuttling wall 133 and a fourth shuttling wall 134, the first shuttling wall 131, the second shuttling wall 132, the third shuttling wall 133 and the fourth shuttling wall 134 are distributed along a radial direction of the tube body 13, a first lumen 135 is formed between the first shuttling wall 131 and the second shuffling wall 132, and a third lumen 136 is formed between the third shuttling wall 133 and the fourth shuttling wall 134.

Please refer to FIG. 1, the tip 11 includes a first mounting wall 111, a second mounting wall 112, a third mounting wall 113 and a fourth mounting wall 114, the first mounting wall 111, the second mounting wall 112, the third mounting wall 113 and the fourth mounting wall 114 are distributed along a radial direction of the tip 11, and a second lumen 115 is formed between the first mounting wall 111 and the second mounting wall 112, a fourth lumen 116 is formed between the third mounting wall 113 and the fourth mounting wall 114.

Figure 3:
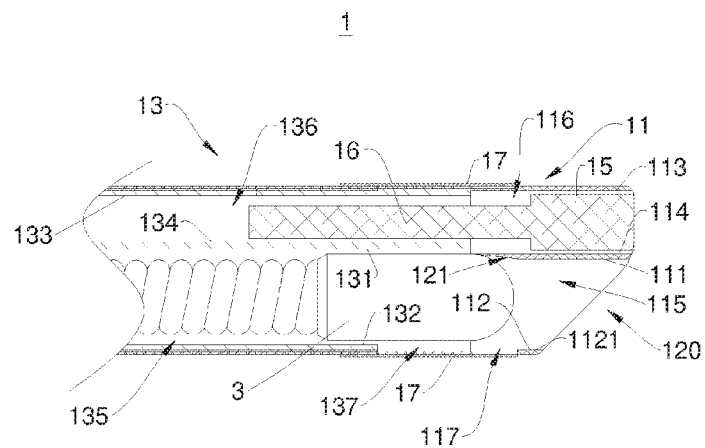
FIG. 3 is a structural schematic diagram of an instrument passing through a first type of imaging catheter in a first state according to an embodiment of the present disclosure.
Figure 4:
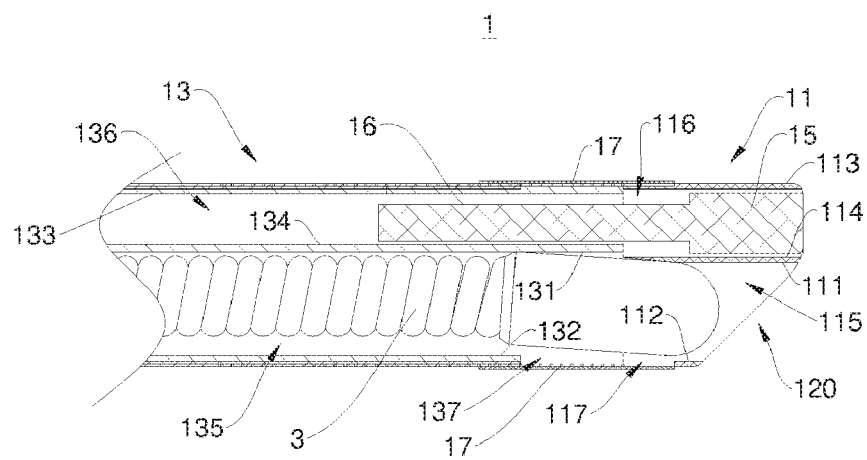
FIG. 4 is a structural schematic diagram of an instrument passing through a first type of imaging catheter in a second state according to an embodiment of the present disclosure.
Figure 5:
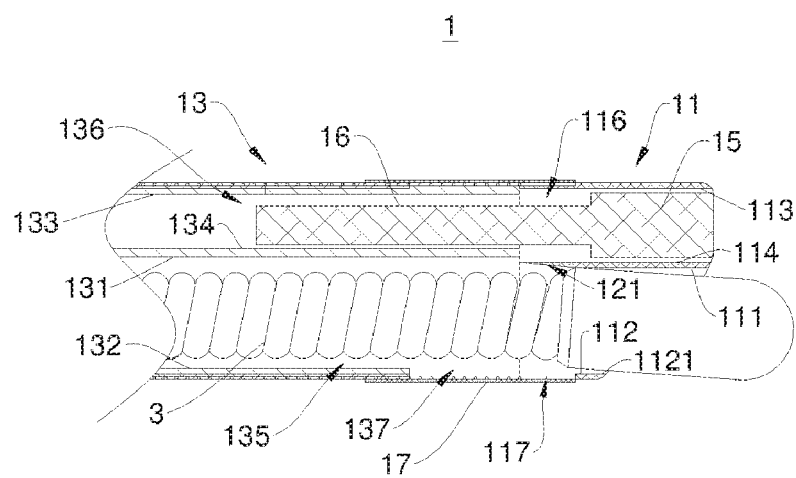
FIG. 5 is a structural schematic diagram of an instrument passing through a first type of imaging catheter in a third state according to an embodiment of the present disclosure.
Figure 6:
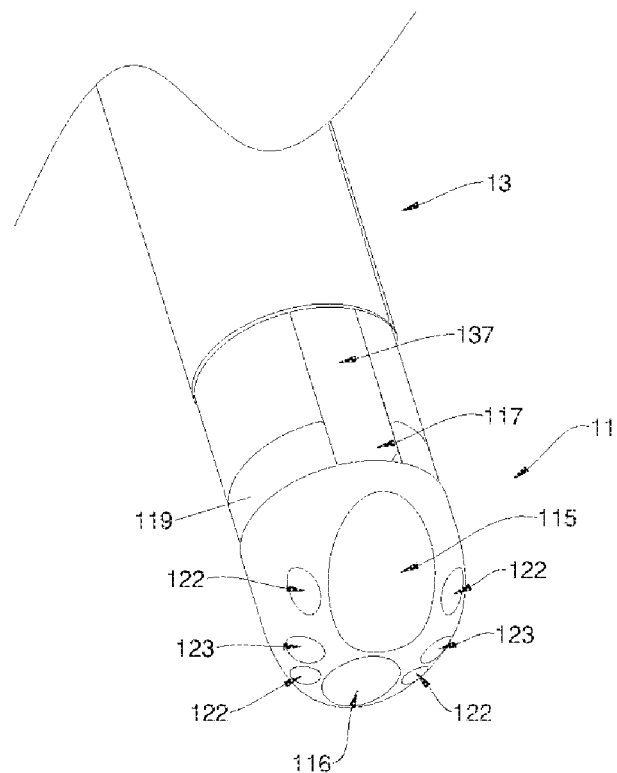
FIG. 6 is a structural schematic diagram of a first type of imaging catheter without a fixing ring according to an embodiment of the present disclosure.

Please refer to FIG. 1, after the tip 11 is connected to the tube body 13, the first lumen 135 is communicated with the second lumen 115 to form a working lumen, and the working lumen is configured to enable an instrument 3 (shown in FIG. 3) to pass therethrough. The third lumen 136 is communicated with the fourth lumen 116 to form an imaging lumen, and the imaging lumen is configured to accommodate the camera 15 and the wire 16.

Specifically, please refer to FIG. 1, the fourth lumen 116 is configured to accommodate the camera 15, and the wire 16 passes through the third lumen 136 and the fourth lumen 116 and is connected to the camera 15. Generally, an outer diameter of the camera 15 is larger than an outer diameter of the wire 16. Therefore, an inner diameter of the fourth lumen 116 is larger than an inner diameter of the third lumen 136, such that both a proximal end of the first mounting wall 111 and a proximal end of the fourth mounting wall 114 correspond between the first shuttling wall 131 and the second shuffling wall 132, so that there is a drop between the proximal end of the first mounting wall 111 and a distal end of the first shuttling wall 131, as introduced in a relative position in FIG. 1, the proximal end of the first mounting wall 111 is below the distal end of the first shuttling wall 131. As a result, a distal end of the second shuffling wall 132 corresponds between the first mounting wall 111 and the second mounting wall 112, such that there is a height difference between the second shuttling wall 132 and the second mounting wall 112, as introduced in the relative position in FIG. 1, the distal end of the second shuttling wall 132 is above the proximal end of the second mounting wall 112. In this way, when an instrument 3 with a large outer diameter is shuttled in the first lumen 135, the instrument 3 cannot easily pass through an area between the proximal end of the first mounting wall 111 and the distal end of the second shuttling wall 132, i.e., an area between j and k in FIG. 1.

The imaging catheter 1 and the medical device provided in this embodiment can effectively improve the above-mentioned technical problem. Specifically, please refer to FIG. 2 to FIG. 6, the medical device includes an imaging catheter 1 and an instrument 3, the imaging catheter 1 includes a tip 11 and a tube body 13, the tube body 13 includes a first shuttling wall 131 and a second shuttling wall 132, the first shuttling wall 131 and the second shuttling wall 132 are distributed along a radial direction of the tube body 13, and a first lumen 135 is formed between the first shuttling wall 131 and the second shuttling wall 132.

The tip 11 includes a first mounting wall 111 and a second mounting wall 112, the first mounting wall 111 and the second mounting wall 112 are distributed along a radial direction of the tip 11, and a second lumen 115 is formed between the first mounting wall 111 and the second mounting wall 112.

A proximal end of the first mounting wall 111 and a proximal end of the second mounting wall 112 are configured to be butted with a distal end of the first shuttling wall 131 and a distal end of the second shuttling wall 132, respectively, so as to enable the second lumen 115 to be communicated with the first lumen 135.

The proximal end of the second mounting wall 112 is provided with a first notch 117 connected with the second lumen 115, the distal end of the second shuttling wall 132 is provided with a second notch 137 communicated with the first lumen 135, and the proximal end of the first notch 117 is communicated with the distal end of the second notch 137.

Figure 2:
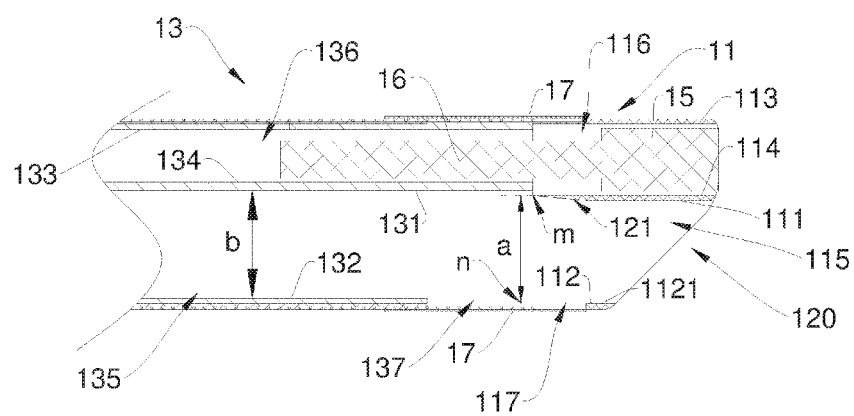
FIG. 2 is a structural schematic diagram of a first type of imaging catheter according to an embodiment of the present disclosure.

Please refer to FIG. 2, point m is a proximal end point of the first mounting wall 111, point n is located in an area corresponding to the second notch 137, a radial distance between the point m and the point n is a, the point n is close to a proximal end of the tube body 13 relative to the point m along the axial direction of the tube body 13, an inner diameter of the first lumen 135 is b, and a≥b. In this way, a height difference between the second shuttling wall 132 and the second mounting wall 112 can be eliminated. After the instrument 3 reaches a distal end of the first lumen 135, the second notch 137 has a space for accommodating the instrument 3, and the instrument 3 can move for a distance towards the second notch 137, and the first notch 117 also has a space for accommodating the instrument 3, such that an instrument 3 having an outer diameter same as the inner diameter of the first lumen 135 can still enter the second lumen 115 from the first lumen 135.

Therefore, the imaging catheter 1 can be compatible with an instrument 3 having an outer diameter same as the inner diameter of the first lumen 135. Of course, the imaging catheter 1 can also be compatible with an instrument 3 whose outer diameter is smaller than the inner diameter of the first lumen 135, that is, the imaging catheter 1 can be compatible with instruments 3 with a larger range of outer diameters, and can be compatible with a wider variety of instruments 3.

It should be noted that, in this embodiment, the axial direction of the tube body 13 is in the same direction as the axial direction of the tip 11, and the radial direction of the tube body 13 is in the same direction as the radial direction of the tip 11. The radial distance referred to in this embodiment may be a distance along the radial direction of the tip 11, or may be a distance along the radial direction of the tube body 13.

It should be noted that, in other embodiments, the second mounting wall 112 may not be provided with the first notch 117, the second shuttling wall 132 may not be provided with the second notch 137, and the point n may be a point on a proximal end of the second mounting wall 112 or a distal end of the second shuttling wall 132, which will be described in detail later.

In this embodiment, the instrument 3 can be a sampling forceps, a net basket, a snare, etc., and a staff can use the instrument 3 to perform a corresponding surgical treatment.

It is worth noting that the proximal end and distal end referred to herein are references to the staff using the device, and during use, an end relatively close to the staff is a proximal end, and an end relatively far from the staff is a distal end. For example, in FIG. 3, the left end of the tube body 13 is a proximal end, the right end of the tube body 13 is a distal end, the left end of the tip 11 is a proximal end, and the right end of the tip 11 is a distal end.

It should be noted that, in this embodiment, a proximal end face of the first mounting wall 111 is aligned with a proximal end face of the second mounting wall 112 along the axial direction of the tip 11, a distal end face of the first shuttling wall 131 is aligned with a distal end face of the second shuttling wall 132 along the axial direction of the tube body 13. In this way, after the tube body 13 is connected to the tip 11, the first notch 117 and the second notch 137 are arranged opposite to each other, the proximal end face of the first notch 117 fits with the distal end face of the second notch 137, and the first notch 117 and the second notch 137 are spliced to form an accommodating space for accommodating the instrument 3, to facilitate the movement of the instrument 3.

Of course, in other embodiments, the tube body 13 and the tip 11 can also be integrally formed. In this way, the first notch 117 and the second notch 137 can form a through hole.

It can be understood that, in this embodiment, the second notch 137 passes through the second shuttling wall 132 along the radial direction of the tube body 13, and the first notch 117 passes through the second mounting wall 112 along the radial direction of the tip 11. In this way, the influence of the wall thicknesses of both the second shuttling wall 132 and the second mounting wall 112 can be eliminated, such that the instrument 3 with a larger outer diameter can more easily enter the second lumen 115 from the first lumen 135.

Please refer to FIG. 2-FIG. 5, in this embodiment, the tube body 13 further includes a third shuttling wall 133 and a fourth shuttling wall 134, the first shuttling wall 131, the second shuttling wall 132, the third shuttling wall 133 and the fourth shuttling wall 134 are distributed along the radial direction of the tube body 13, a third lumen 136 is formed between the third shuttling wall 133 and the fourth shuttling wall 134.

The tip 11 further includes a third mounting wall 113 and a fourth mounting wall 114, the first mounting wall 111, the second mounting wall 112, the third mounting wall 113 and the fourth mounting wall 114 are distributed along the radial direction of the tip 11, and a fourth lumen 116 is formed between the third mounting wall 113 and the fourth mounting wall 114.

A proximal end of the third mounting wall 113 is configured to be butted with a distal end of the third shuttling wall 133, and a proximal end of the fourth mounting wall 114 is configured to be butted with a distal end of the fourth shuttling wall 134, such that the fourth lumen 116 can be communicated with the third lumen 136.

It should be noted that, in this embodiment, "butt" of two ends can be understood as along the axial direction of the tip 11 or the tube body 13, end faces of the two ends are aligned with each other, and along the radial direction of the tip 11 or the tube body 13, the end faces of the two ends may be in contact with or spaced apart from each other. For example, reference to that the proximal end of the third mounting wall 113 is configured to be butted with the distal end of the third shuttling wall 133 means: the proximal end face of the third mounting wall 113 and the distal end face of the third shuttling wall 133 are aligned with each other along the axial direction of the tip 11 or the tube body 13, and the proximal end face of the third mounting wall 113 abuts against the distal end face of the third shuttling wall 133 along the radial direction of the tip 11 or the tube body 13; and reference to that a proximal end of the fourth mounting wall 114 is configured to be butted with a distal end of the fourth shuttling wall 134 means: the proximal end face of the fourth mounting wall 114 and the distal end face of the fourth shuttling wall 134 are aligned with each other along the axial direction of the tip 11 or the tube body 13, and the proximal end face of the fourth mounting wall 114 and the distal end face of the fourth shuttling wall 134 are spaced apart from each other along the radial direction of the tip 11 or the tube body 13.

In this embodiment, since an inner diameter of the fourth lumen 116 is larger than an inner diameter of the third lumen 136, such that both the proximal end of the fourth mounting wall 114 and the proximal end of the first mounting wall 111 correspond between the first shuttling wall 131 and the second shuttling wall 132.

In this embodiment, the imaging catheter 1 further includes a camera 15 and a wire 16, the wire 16 passes through the third lumen 136 and the fourth lumen 116 and is connected to the camera 15 within the fourth lumen 116. It should be noted that the fourth lumen 116 accommodates the camera 15, and the third lumen 136 accommodates the wire 16. Generally, an outer diameter of the camera 15 is larger than the outer diameter of the wire 16, so an inner diameter of the fourth lumen 116 is greater than an inner diameter of the third lumen 136.

It can be understood that, in this embodiment, the staff can use the camera 15 to observe lesions and stones within the biliary tract.

In this embodiment, the medical device further includes a handle component, one end of the wire 16 is connected to the camera 15, and the other end of the wire 16 is connected to the handle component, and the staff can control the working state of the camera 15 through the handle component.

Please refer to FIG. 2 to FIG. 5, in this embodiment, the imaging catheter 1 further includes a fixing ring 17, a distal end of the fixing ring 17 is sleeved around an outer wall of a proximal end of the tip 11, and a proximal end of the fixing ring 17 is sleeved around an outer wall of a distal end of the tube body 13, such that the tube body 13 and the tip 11 can be relatively fixed. Moreover, after the fixing ring 17 is sleeved around the tube body 13 and the tip 11, the fixing ring 17 can close the first notch 117 and the second notch 137, and prevent the instrument 3 from passing out of the first notch 117 and the second notch 137, so as to prevent the instrument 3 from passing out from a wrong position, and affecting the normal operation of a surgery.

Referring to FIG. 6 to FIG. 9, and in conjunction with FIG. 2 to FIG. 5, in this embodiment, the tip 11 includes a main body 118 and an extended portion 119, a distal end of the extended portion 119 is connected to a proximal end of the main body 118, and a proximal end of the extended portion 119 is connected to a distal end of the tube body 13, and an outer diameter of the extended portion 119 is smaller than an outer diameter of the main body 118, such that a stepped structure is formed between the extended portion 119 and the main body 118.

It should be noted that, in this embodiment, a distal end of the fixing ring 17 is directly sleeved around the extended portion 119, and a distal end face of the fixing ring 17 abuts against a proximal end face of the main body 118, which facilitates the installation and disassembly of the fixing ring 17.

In this embodiment, the main body 118 and the extended portion 119 are integrally formed, the second lumen 115 passes through both the extended portion 119 and the main body 118, and both a proximal end of the first mounting wall 111 and a proximal end of the second mounting wall 112 are arranged on the extended portion 119, and thus the first notch 117 is also arranged on the extended portion 119. Specifically, a distal end of the first notch 117 extends to the main body 118. This facilitates the processing and manufacturing of the first notch 117.

Figure 7:
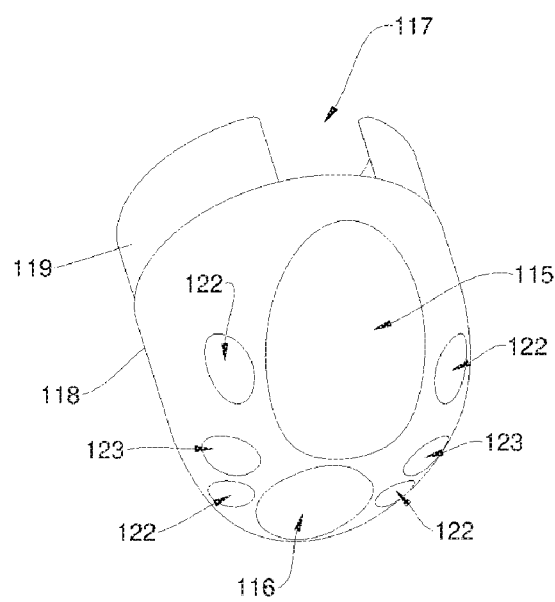
FIG. 7 is a structural schematic diagram of a first type of tip from a first perspective according to an embodiment of the present disclosure.
Figure 8:
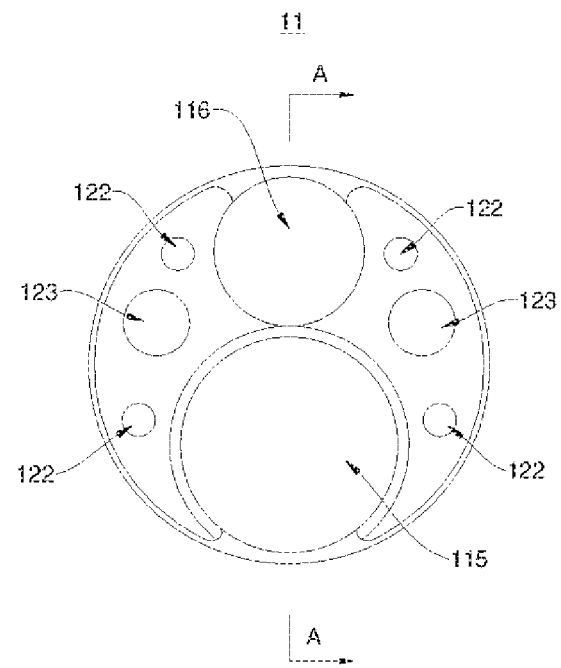
FIG. 8 is a structural schematic diagram of a first type of tip from a second perspective according to an embodiment of the present disclosure.
Figure 9:
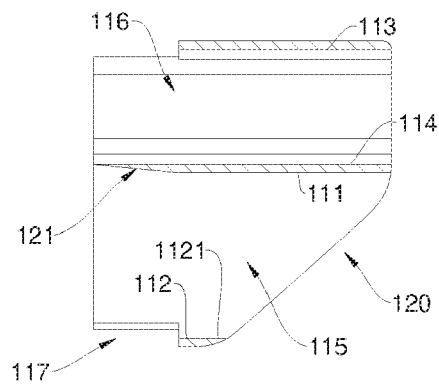
FIG. 9 is a structural schematic diagram of a first type of tip from a third perspective according to an embodiment of the present disclosure.
Figure 10:
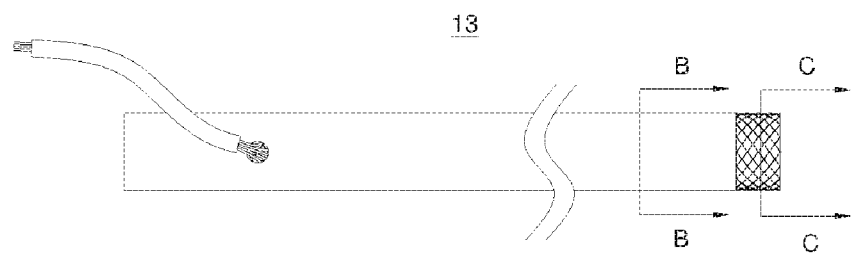
FIG. 10 is a structural schematic diagram of a first type of tube body from a first perspective according to an embodiment of the present disclosure.

Referring to FIG. 7 to FIG. 9, and in conjunction with FIG. 2 to FIG. 6, in this embodiment, the second mounting wall 112 further includes a transition wall 1121, a distal end of the tip 11 has an outlet 120 configured to allow an instrument 3 to pass out of the second lumen 115, a proximal end of the transition wall 1121 extends to a distal end of the first notch 117, and a distal end of the transition wall 1121 extends to the outlet 120.

It can be understood that the transition wall 1121 is arranged between the first notch 117 and the outlet 120, such that after the instrument 3 enters the second lumen 115, the transition wall 1121 has a limiting effect on the instrument 3. By operating the proximal end of the instrument 3, a doctor can smoothly adjust the position of the distal end of the instrument 3 under the action of the transition wall 1121, thereby facilitating the instrument 3 to pass out of the outlet 120 of the second lumen 115.

Of course, in other embodiments, there may be no transition wall 1121 arranged between the first notch 117 and the outlet 120, i.e., a distal end of the first notch 117 can also be in direct communication with the outlet 120.

It should be noted that, referring to FIG. 9 and in conjunction with FIG. 2 to FIG. 5, since the proximal end of the first mounting wall 111 corresponds between the first shuttling wall 131 and the second shuttling wall 132, the instrument 3, when entering the second lumen 115 from a distal end of the first lumen 135, is easily butted by the proximal end of the first mounting wall 111, resulting in that the process of the instrument 3 entering the second lumen 115 from the first lumen 135 for the instrument 3 is not smooth. Therefore, in this embodiment, a guide surface 121 is provided on a wall surface of a proximal end of the first mounting wall 111, and the guide surface 121 can guide the instrument 3 passing out of the first lumen 135 into the second lumen 115, and can make the process of the instrument 3 entering the second lumen 115 from the first lumen 135 more smooth.

Specifically, in this embodiment, please refer to FIG. 9 and in conjunction with FIG. 2 to FIG. 5, the guide surface 121 is an inclined surface, a graph of the guide surface 121 intercepted by a reference plane is a first straight line inclined relative to a central axis of the tip 11, and along a direction from a proximal end of the first straight line to a distal end of the first straight line, a radial distance from the first straight line to the second mounting wall 112 gradually decreases, where an extended direction of the central axis of the tip 11 is an axial direction of the tip 11, the reference plane is a plane passing through the central axis, and the radial distance is a distance along the radial direction of the tip 11.

It is worth noting that the guide surface 121 can not only effectively improve the problem that the instrument 3 does not enter the second lumen 115 smoothly from the first lumen 135, but also can effectively reduce the wall thickness of the first mounting wall 111, which is more convenient for the instrument 3 with a large outer diameter to enter the second lumen 115.

It should be noted that, in this embodiment, the guide surface 121 is arranged opposite to the first notch 117, and the first notch 117 has a space configured to accommodate the instrument 3, such that the guide surface 121 can guide the instrument 3 to move toward the first notch 117, which is more convenient for the instrument 3 to enter the second lumen 115.

In addition, please refer to FIG. 7 to FIG. 9, and in conjunction with FIG. 2 to FIG. 5, in this embodiment, a graph of an outer contour of the outlet 120 intercepted by the reference plane is a second straight line inclined relative to the central axis of the tip 11, an inclined direction of the second straight line relative to the central axis is opposite to an inclined direction of the first straight line relative to the central axis.

In this way, under the action of the guide surface 121, a distal end of the instrument 3 entering the second lumen 115 can be directly aligned with the outlet 120, which can reduce the stroke of the instrument 3 within the second lumen 115, thereby making the instrument 3 pass out of the outlet 120 faster.

It should be noted that, in other embodiments, a graph of the outer contour of the outlet 120 intercepted by the reference plane may also be an arc line. Specifically, it may be that a concave side of the arc line faces the second lumen 115, or a convex side of the arc line faces the second lumen 115.

Generally, a distal surface of the instrument 3 is an arc surface. When the distal end of the instrument 3 abuts against the guide surface 121, the guide surface 121 can more easily change the moving direction of the instrument 3, such that the front end of the instrument 3 is aligned with the outlet 120, and the movement of the instrument 3 along the guide surface 121 can also be smoother.

It should be noted that, in this embodiment, a proximal end point of the guide surface 121 coincides with a proximal end point of the first mounting wall 111. In this way, while entering the second lumen 115 from the first lumen 135, the instrument 3 can contact the guide surface 121, and the guide surface 121 can change the moving direction of the instrument 3 at the first time. Moreover, such an arrangement can further improve the smoothness of the instrument 3 entering from the first lumen 135 into the second lumen 115.

It should be noted that, if the moving direction of the instrument 3 within the second lumen 115 deviates and moves toward the second mounting wall 112, then the transition wall 1121 can change the moving direction of the instrument 3, such that a distal end of the instrument 3 can be realigned with the outlet 120. That is to say, in this embodiment, the transition wall 1121 is used in combination with the guide surface 121 to make the movement of the instrument 3 within the second lumen 115 smoother, such that the instrument 3 can pass out of the outlet 120 more quickly, thereby effectively improving work efficiency.

In addition, please refer to FIG. 7, in this embodiment, since a distal end face of the second lumen 115 is an inclined surface, such that the diameter of the outlet 120 can be enlarged, which is convenient for the instrument 3 to pass through.

Referring to FIG. 7 and FIG. 8, in this embodiment, the tip 11 further has a fifth lumen 122, where the fifth lumen 122 is configured to allow a pulling wire to pass through. In an actual practical process, the fifth lumen 122 is sleeved outside the pulling wire, and under the guiding action of the pulling wire, the tip 11 can reach a preset position along an extending direction of the pulling wire.

It should be noted that, in this embodiment, the number of the fifth lumens 122 is four, and the four fifth lumens 122 are respectively arranged at four corners of the tip 11, and such an arrangement has a better guiding effect, such that the tip 11 is less likely to deviate from a normal track during the process of threading the pulling wire.

Please refer to FIG. 7 and FIG. 8, in this embodiment, the tip 11 further has a sixth lumen 123, the sixth lumen 123 is configured to allow an injected liquid to pass therethrough, and the liquid flows out of a distal end of the sixth lumen 123, and acts on a preset site to assist in surgical treatment. In this embodiment, the number of the sixth lumens 123 is two, the two sixth lumens 123 are arranged opposite to each other, and the two sixth lumens 123 are respectively arranged on opposite two sides of the tip 11.

It should be noted that, in this embodiment, since a distal end face of the tip 11 is an inclined surface, such that diameters of openings of distal ends of the fifth lumen 122 and the sixth lumen 123 are enlarged, which is beneficial to the passage of the pulling wire and the injected liquid.

It is worth noting that, in this embodiment, the material of the tip 11 is made of medical grade 304 stainless steel, and then the tip 11 is machined or integrally formed by powder metallurgy. In other embodiments, the material of the tip 11 can also be a PEEK-type hard plastic material.

Referring to FIG. 10-FIG. 13, and in conjunction with FIG. 2-FIG. 5, in this embodiment, the tube body 13 includes a metal mesh tube 138 and a multi-lumen tube 139, and the multi-lumen tube 139 is sheathed within the metal mesh tube 138.

It should be noted that the multi-lumen tube 139 itself is a hose, and sleeving a metal mesh tube 138 around an outer wall of the multi-lumen tube 139 can enhance the strength and rigidity of the multi-lumen tube 139.

In this embodiment, the metal mesh tube 138 is formed by hot-melting a single-lumen tube and a metal mesh. Specifically, the metal mesh 140 is sleeved around an outer wall of the multi-lumen tube 139, and then the single-lumen tube is sleeved around an outer wall of the metal mesh 140, and further, the metal mesh 140 is formed in the single-lumen tube through a hot-melting process.

It should be noted that the above-mentioned first shuttling wall 131, second shuttling wall 132, third shuttling wall 133 and fourth shuttling wall 134 are all arranged on the multi-lumen tube 139. Correspondingly, the above-mentioned first lumen 135 and the third lumen 136 are also arranged on the multi-lumen tube 139.

Figure 11:
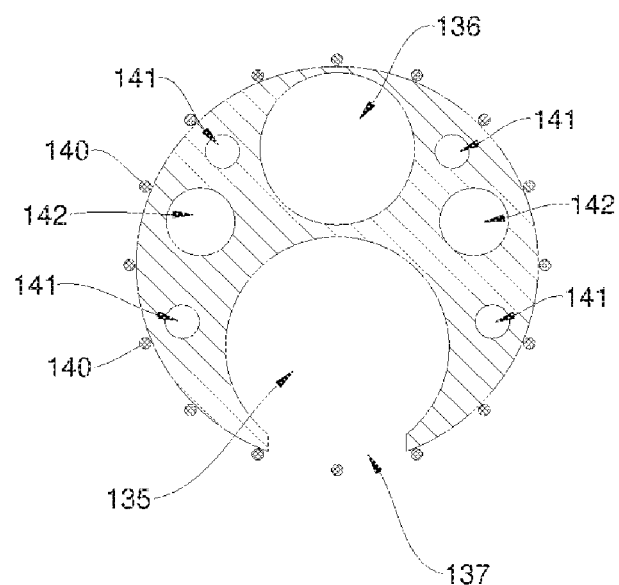
FIG. 11 is a structural schematic diagram of a first type of tube body from a second perspective according to an embodiment of the present disclosure.
Figure 12:
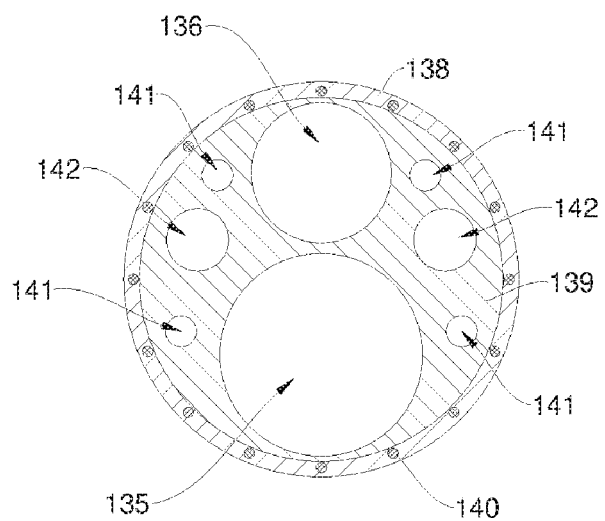
FIG. 12 is a structural schematic diagram of a first type of tube body from a third perspective according to an embodiment of the present disclosure.
Figure 13:
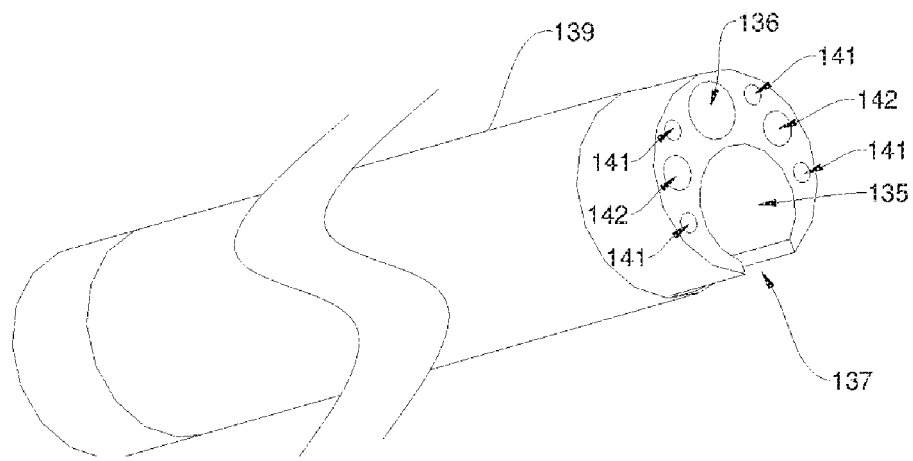
FIG. 13 is a structural schematic diagram of a multi-lumen tube according to an embodiment of the present disclosure.

It is worth noting that, please refer to FIG. 11 to FIG. 13, in this embodiment, the multi-lumen tube 139 also has a seventh lumen 141, where the seventh lumen 141 is configured to allow the pulling wire to pass therethrough, and its specific function is the same as the above-mentioned fifth lumen 122.

Specifically, in this embodiment, a distal end of the seventh lumen 141 is communicated with a proximal end of the fifth lumen 122, the number of the seventh lumen 141 is also four, where the four seventh lumen 141 and the four fifth lumens 122 are in one-to-one correspondence.

Please refer to FIG. 11 to FIG. 13, in this embodiment, the multi-lumen tube 139 further has an eighth lumen 142 configured to allow the injected liquid to pass therethrough, where the function of the eighth lumen 142 is the same as that of the above-mentioned sixth lumen 123. Specifically, in this embodiment, a distal end of the eighth lumen 142 is communicated with a proximal end of the sixth lumen 123, and the injected liquid enters from a proximal end of the eighth lumen 142, and then enters the sixth lumen 123 from a distal end of the eighth lumen 142, and is finally outputted from a distal end of the sixth lumen 123. The number of the eighth lumen 142 is the same as that of the sixth lumen 123, and is also two, and the two eighth lumens 142 are in one-to-one correspondence with the two sixth lumens 123.

It should be noted that the multi-lumen tube 139 may be an integrally molded piece, or may be formed by splicing multiple materials.

Figure 14:
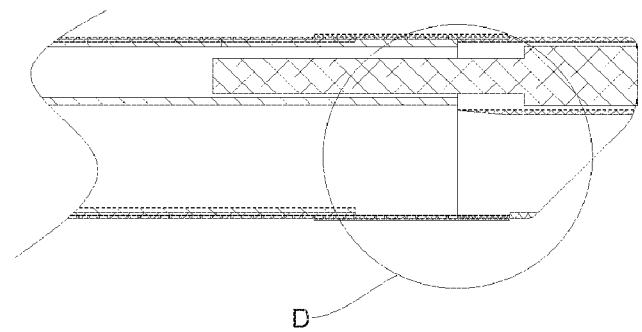
FIG. 14 is a structural schematic diagram of an instrument passing through a second type of imaging catheter according to an embodiment of the present disclosure.
Figure 15:
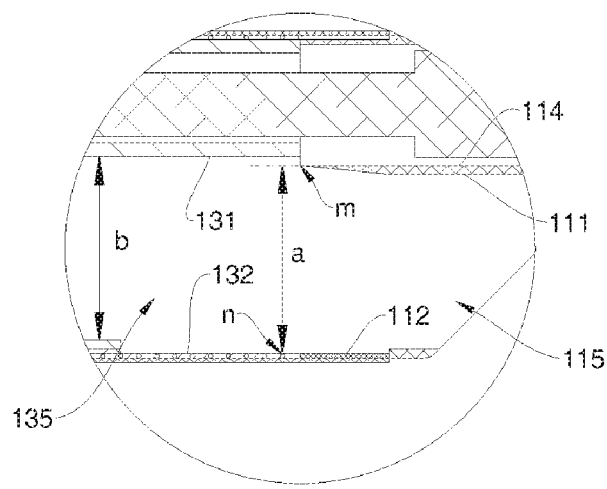
FIG. 15 is an enlarged schematic diagram at D in FIG. 14.

Please refer to FIG. 14 and FIG. 15, in other embodiments, instead of having the first notch 117 and the second notch 137 arranged on the second shuttling wall 132 and the second mounting wall 112, the instrument 3 with a large outer diameter can smoothly enter the second lumen 115 from the first lumen 135 by reducing the wall thicknesses of the second shuttling wall 132 and the second mounting wall 112.

Specifically, as shown in FIG. 14 and FIG. 15, at this time, point n is located on the second shuttling wall 132, point m is a proximal end point of the first mounting wall 111, a radial distance between the point m and the point n is a, the point n is close to a proximal end of the tube body 13 relative to the point m along the axial direction of the tube body 13, an inner diameter of the first lumen 135 is b, and a≥b. In this way, when the outer diameter of the instrument 3 is equal to the inner diameter of the first lumen 135, the instrument 3 entering the first lumen 135 can also enter the second lumen 115 from the first lumen 135, which can also enable the imaging catheter 1 to be compatible with instruments 3 with a greater range of outer diameters, and thus be compatible with a wider variety of instruments 3.

Figure 16:
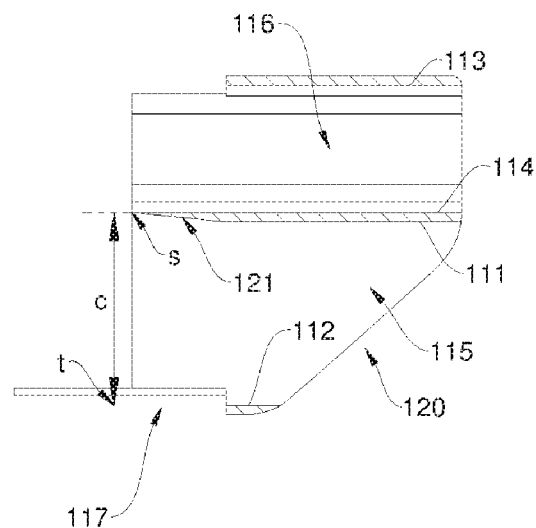
FIG. 16 is a structural schematic diagram of a second type of tip according to an embodiment of the present disclosure.

Please refer to FIG. 16, FIG. 16 is a structural schematic diagram of the second type of tip 11 provided in this embodiment. The second type of tip 11 has most of the same structure as the first type of tip 11 described above, except that the proximal end of the first mounting wall 111 is close to the distal end of the tip 11 relative to the proximal end of the second mounting wall 112 along the axial direction of tip 11.

In this way, after the tip 11 in FIG. 16 is connected to the tube body 13, the first notch 117 provided on the second mounting wall 112 faces the second shuttling wall 132, such that the proximal end of the first notch 117 is communicated with the first lumen 135, the distal end of the first notch 117 is communicated with the second lumen 115, and the first notch 117 has a space capable of accommodating the instrument 3. As shown in FIG. 16, point s is the proximal end point of the first mounting wall 111, point t is located in an area corresponding to the first notch 117, point s is close to a distal end of the tip 11 relative to point t along the axial direction of the tip 11, a radial distance between the point s and the point t is c, the inner diameter of the first lumen 135 is d, and c≥d. This also allows the instrument 3 with the same outer diameter as the inner diameter of the first lumen 135 to enter the second lumen 115 through a junction of the first lumen 135 and the second lumen 115, which can also enable the imaging catheter 1 to be compatible with instruments 3 with a greater range of outer diameters, and thus be compatible with a wider variety of instruments 3.

Figure 17:
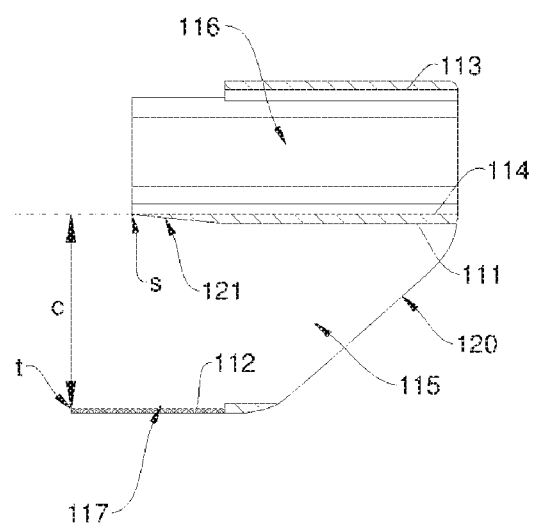
FIG. 17 is a structural schematic diagram of a third tip according to an embodiment of the present disclosure.

Of course, please refer to FIG. 17, in other embodiments, instead of having the first notch 117 arranged on the second mounting wall 112 of the tip 11 shown in FIG. 16, the instrument 3 with a large outer diameter can smoothly enter the second lumen 115 from the first lumen 135 by reducing the wall thickness of the second mounting wall 112.

Specifically, as shown in FIG. 17, at this time, the point s is the proximal end point of the first mounting wall 111, the point t is located on the second mounting wall 112, and the point s is close to the distal end of the tip 11 relative to the point t along the axial direction of the tip 11, a radial distance between the point s and the point t is c, the inner diameter of the first lumen 135 is d, and c≥d. In this way, when the outer diameter of the instrument 3 is equal to the inner diameter of the first lumen 135, the instrument 3 entering the first lumen 135 can also enter the second lumen 115 from the first lumen 135, which can also enable the imaging catheter 1 to be compatible with instruments 3 with a greater range of outer diameters, and thus be compatible with a wider variety of instruments 3.

Figure 18:
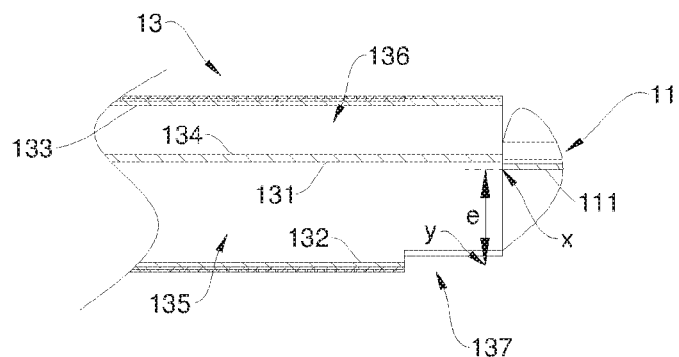
FIG. 18 is a structural schematic diagram of a second type of tube body according to an embodiment of the present disclosure.

Please refer to FIG. 18, correspondingly, FIG. 18 is a structural schematic diagram of the second type of tube body 13 provided in this embodiment. The second type of tube body 13 has mostly the same structure as the above-mentioned first type of tube body 13, except that a distal end of the first shuttling wall 131 is close to a proximal end of the tube body 13 relative to a distal end of the second shuttling wall 132 along the axial direction of the tube body 13.

In this way, after the tube body 13 in FIG. 18 is connected to the tip 11, the second notch 137 provided on the second shuttling wall 132 faces the second mounting wall 112, such that a proximal end of the second notch 137 is communicated with the first lumen 135, a distal end of the second notch 137 is communicated with the second lumen 115, and the second notch 137 has a space capable of accommodating the instrument 3. As shown in FIG. 18, point x is a proximal end point of the first mounting wall, point y is located in an area corresponding to the second notch 137, and point y is close to a proximal end of the tube body 13 relative to point x along an axial direction of the tube body 13. This also enables the instrument 3 located within the first lumen 135 to enter the second lumen 115 through a junction of the first lumen 135 and the second lumen 115.

Figure 19:
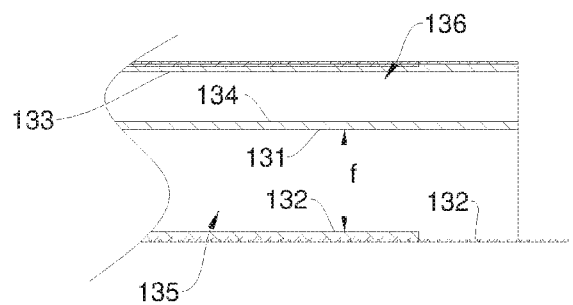
FIG. 19 is a structural schematic diagram of a third type of tube body according to an embodiment of the present disclosure.

Of course, please refer to FIG. 19, in other embodiments, instead of having the second notch 137 arranged on the second shuttling wall 132 of the tube body 13 shown in FIG. 18, the instrument 3 with a large outer diameter can smoothly enter the second lumen 115 from the first lumen 135 by reducing the wall thickness of the second shuttling wall 132.

Figure 20:
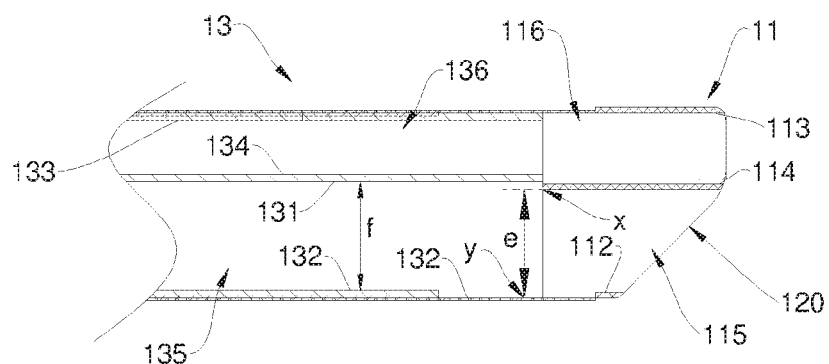
FIG. 20 is a structural schematic diagram of a connection between a third tube body and a tip according to an embodiment of the present disclosure.

Specifically, as shown in FIG. 19 and FIG. 20, at this time, point x is a proximal end point of the first mounting wall 111, point y is located on the second shuttling wall 132, and point y is close to the proximal end of the tube body 13 relative to the point x along the axial direction of the tube body 13, a radial distance between the point x and the point y is e, an inner diameter of the first lumen 135 is f, and e≥f. In this way, when the outer diameter of the instrument 3 is equal to the inner diameter of the first lumen 135, instrument 3 entering the first lumen 135 can also enter the second lumen 115 from the first lumen 135, which can also enable the imaging catheter 1 to be compatible with instruments 3 with a greater range of outer diameters, and thus be compatible with a wider variety of instruments 3.

The foregoing description is only specific embodiments of the present disclosure; however, the scope of protection of the present disclosure is not limited thereto, and changes or substitutions that can be readily think of by any person skilled in the art within the technical scope disclosed in the present disclosure shall be covered by the scope of protection of the present disclosure. Therefore, the protection scope of the present disclosure shall be subject to the protection scope of the claims.

What is claimed is:

1. An imaging catheter, comprising: a tube body and a tip, wherein the tube body comprises a first shuttling wall and a second shuttling wall, the first shuttling wall and the second shuttling wall are distributed along a radial direction of the tube body, and a first lumen is formed between the first shuttling wall and the second shuttling wall;
    the tip comprises a first mounting wall and a second mounting wall, the first mounting wall and the second mounting wall are distributed along a radial direction of the tip, and a second lumen is formed between the first mounting wall and the second mounting wall;
    a proximal end of the first mounting wall and a proximal end of the second mounting wall are configured to be butted with a distal end of the first shuttling wall and a distal end of the second shuttling wall, respectively, so as to enable the second lumen to be communicated with the first lumen, and the proximal end of the first mounting wall corresponds between the first shuttling wall and the second shuttling wall, such that there is a drop between the proximal end of the first mounting wall and the distal end of the first shuttling wall;
    a radial distance between a point m and a point n is a, and an inner diameter of the first lumen is b, wherein a≥b, to eliminate the drop, so as to enable an instrument to enter the second lumen from the first lumen;
    wherein the point m is a proximal end point of the first mounting wall, the point n is a point on the proximal end of the second mounting wall or the distal end of the second shuttling wall, and the point n is close to a proximal end of the tube body relative to the point m along an axial direction of the tube body;
    wherein the proximal end of the second mounting wall is provided with a first notch connected with the second lumen, the distal end of the second shuttling wall is provided with a second notch communicated with the first lumen, a proximal end of the first notch is communicated with a distal end of the second notch, and the point n is located in an area corresponding to the second notch.

2. The imaging catheter according to claim 1, wherein a proximal end face of the first mounting wall is aligned with a proximal end face of the second mounting wall along an axial direction of the tip, a distal end face of the first shuttling wall is aligned with a distal end face of the second shuttling wall along the axial direction of the tube body, and the axial direction of the tube body is in the same direction as the axial direction of the tip.

3. The imaging catheter according to claim 1, wherein the tip comprises a main body and an extended portion, a distal end of the extended portion is connected to a proximal end of the main body, and a proximal end of the extended portion is connected to a distal end of the tube body, and an outer diameter of the extended portion is smaller than an outer diameter of the main body, such that a stepped structure is formed between the extended portion and the main body;
    the second lumen passes through both the extended portion and the main body, and the proximal end of the first mounting wall, the proximal end of the second mounting wall and the first notch are all arranged on the extended portion.

4. The imaging catheter according to claim 1, wherein the second mounting wall comprises a transition wall, a distal end of the tip has an outlet configured to allow the instrument to pass out of the second lumen, a proximal end of the transition wall extends to a distal end of the first notch, a distal end of the transition wall extends to the outlet, and the transition wall is configured to change a moving direction of the instrument such that the instrument passes out of the outlet.

5. The imaging catheter according to claim 1, wherein the imaging catheter further comprises a fixing ring, a distal end of the fixing ring is sleeved around an outer wall of a proximal end of the tip, and a proximal end of the fixing ring is sleeved around an outer wall of a distal end of the tube body, such that the tube body and the tip are relatively fixed, and the fixing ring is configured to close the first notch and the second notch.

6. The imaging catheter according to claim 1, wherein a guide surface is arranged on a wall surface of the proximal end of the first mounting wall, the guide surface is configured to guide the instrument passed out of the first lumen into the second lumen;
    wherein a graph of the guide surface intercepted by a reference plane is a first straight line inclined relative to a central axis of the tip, and a radial distance from the first straight line to the second mounting wall gradually decreases along a direction from a proximal end of the first straight line to a distal end of the first straight line, wherein the reference plane is a plane passing through the central axis; and
    wherein a distal end of the tip has an outlet configured to allow the instrument to pass out of the second lumen, a graph of an outer contour of the outlet intercepted by the reference plane is a second straight line or an arc line inclined relative to the central axis, an inclined direction of the second straight line the an arc line relative to the central axis is opposite to an inclined direction of the first straight line relative to the central axis, and the guide surface is configured to guide the instrument located in the second lumen to pass out of the outlet.

7. The imaging catheter according to claim 1, wherein a guide surface is arranged on a wall surface of the proximal end of the first mounting wall, the guide surface is configured to guide the instrument passed out of the first lumen into the second lumen, and wherein a proximal end point of the guide surface coincides with the proximal end point of the first mounting wall.

8. The imaging catheter according to claim 1, wherein the tube body comprises a metal mesh tube and a multi-lumen tube, and the multi-lumen tube is sheathed within the metal mesh tube.

9. The imaging catheter according to claim 1, wherein the tube body further comprises a third shuttling wall and a fourth shuttling wall, the first shuttling wall, the second shuttling wall, the third shuttling wall and the fourth shuttling wall are distributed along the radial direction of the tube body, and a third lumen is formed between the third shuttling wall and the fourth shuttling wall;
    the tip further comprises a third mounting wall and a fourth mounting wall, the first mounting wall, the second mounting wall, the third mounting wall and the fourth mounting wall are distributed along the radial direction of the tip, and a fourth lumen is formed between the third mounting wall and the fourth mounting wall;
    a proximal end of the third mounting wall is configured to be butted with a distal end of the third shuttling wall, and a proximal end of the fourth mounting wall is configured to be butted with a distal end of the fourth shuttling wall, such that the fourth lumen is communicated with the third lumen;
    wherein an inner diameter of the fourth lumen is larger than an inner diameter of the third lumen, such that both the proximal end of the fourth mounting wall and the proximal end of the first mounting wall correspond between the first shuttling wall and the second shuttling wall; and
    wherein the imaging catheter further comprises a camera and a wire, the camera is mounted within the fourth lumen, and the wire is configured to pass through the third lumen and the fourth lumen, and is connected with the camera.

10. A tip configured to be assembled with a tube body, the tube body comprises a first shuttling wall and a second shuttling wall, the first shuttling wall and the second shuttling wall are distributed along a radial direction of the tube body, and a first lumen is formed between the first shuttling wall and the second shuttling wall; wherein the tip comprises a first mounting wall and a second mounting wall, the first mounting wall and the second mounting wall are distributed along a radial direction of the tip, and a second lumen is formed between the first mounting wall and the second mounting wall;
    a proximal end of the first mounting wall and a proximal end of the second mounting wall are configured to be butted with a distal end of the first shuttling wall and a distal end of the second shuttling wall, respectively, so as to enable the second lumen to be communicated with the first lumen, and the proximal end of the first mounting wall is configured to correspond between the first shuttling wall and the second shuttling wall, such that there is a drop between the proximal end of the first mounting wall and the distal end of the first shuttling wall;
    a radial distance between a point s and a point t is c, and an inner diameter of the first lumen is d, wherein c≥d, to eliminate the drop, so as to enable an instrument to enter the second lumen from the first lumen;
    wherein the point s is a proximal end point of the first mounting wall, the point t is located on a proximal end portion of the second mounting wall, and the point s is close to a distal end of the tip relative to the point t along an axial direction of the tip;

wherein the proximal end of the second mounting wall is provided with a first notch communicated with the second lumen, the first notch is configured to face towards the second shuttling wall, so as to enable the first notch to be communicated with the first lumen, and the point t is located in an area corresponding to the first notch.

11. The tip according to claim 10, wherein the tip comprises a main body and an extended portion, a distal end of the extended portion is connected to a proximal end of the main body, a proximal end of the extended portion is configured to connect to a distal end of the tube body, an outer diameter of the extended portion is smaller than an outer diameter of the main body, such that a stepped structure is formed between the extended portion and the main body;

the second lumen passes through both the extended portion and the main body, and the proximal end of the first mounting wall, the proximal end of the second mounting wall and the first notch are all arranged on the extended portion; and wherein a distal end of the first notch extends to the main body such that the distal end of the first notch corresponds to the second lumen, and a proximal end of the first notch is configured to correspond to the first lumen.

12. The tip according to claim 10, wherein the second mounting wall comprises a transition wall, a distal end of the tip has an outlet configured to allow the instrument to pass out of the second lumen, a proximal end of the transition wall extends to a distal end of the first notch, a distal end of the transition wall extends to the outlet, and the transition wall is configured to change a moving direction of the instrument such that the instrument passes out of the outlet.

13. The tip according to claim 10, wherein a guide surface is arranged on a wall surface of the proximal end of the first mounting wall, the guide surface is configured to guide the instrument passed out of the first lumen into the second lumen;

wherein a graph of the guide surface intercepted by a reference plane is a first straight line inclined relative to a central axis of the tip, and a radial distance from the first straight line to the second mounting wall gradually decreases along a direction from a proximal end of the first straight line to a distal end of the first straight line, wherein the reference plane is a plane passing through the central axis;

wherein the distal end of the tip has an outlet configured to allow the instrument to pass out of the second lumen, a graph of an outer contour of the outlet intercepted by the reference plane is a second straight line or an arc line inclined relative to the central axis, an inclined direction of the second straight line or the arc line relative to the central axis is opposite to an inclined direction of the first straight line relative to the central axis, and the guide surface is configured to guide the instrument located in the second lumen to pass out of the outlet.

14. The tip according to claim 10, wherein a guide surface is arranged on a wall surface of the proximal end of the first mounting wall, the guide surface is configured to guide the instrument passed out of the first lumen into the second lumen, and wherein a proximal end point of the guide surface coincides with the proximal end point of the first mounting wall.

15. The tip according to claim 10, wherein the tube body further comprises a third shuttling wall and a fourth shuttling wall, the first shuttling wall, the second shuttling wall, the third shuttling wall and the fourth shuttling wall are distributed along the radial direction of the tube body, and a third lumen is formed between the third shuttling wall and the fourth shuttling wall;

the tip further comprises a third mounting wall and a fourth mounting wall, the first mounting wall, the second mounting wall, the third mounting wall and the fourth mounting wall are distributed along the radial direction of the tip, and a fourth lumen is formed between the third mounting wall and the fourth mounting wall;

a proximal end of the third mounting wall is configured to be butted with a distal end of the third shuttling wall, and a proximal end of the fourth mounting wall is configured to be butted with a distal end of the fourth shuttling wall, such that the fourth lumen is communicated with the third lumen;

wherein an inner diameter of the fourth lumen is larger than an inner diameter of the third lumen, such that both the proximal end of the fourth mounting wall and the proximal end of the first mounting wall correspond between the first shuttling wall and the second shuttling wall.

16. A tube body configured to be assembled with a tip, the tip comprises a first mounting wall and a second mounting wall, the first mounting wall and the second mounting wall are distributed along a radial direction of the tip, and a second lumen is formed between the first mounting wall and the second mounting wall; wherein the tube body comprises a first shuttling wall and a second shuttling wall, the first shuttling wall and the second shuttling wall are distributed along a radial direction of the tube body, and a first lumen is formed between the first shuttling wall and the second shuttling wall;

a distal end of the first shuttling wall and a distal end of the second shuttling wall are configured to be butted with a proximal end of the first mounting wall and a proximal end of the second mounting wall, respectively, so as to enable the first lumen to be communicated with the second lumen, and the proximal end of the first mounting wall is configured to correspond between the first shuttling wall and the second shuttling wall, such that there is a drop between the proximal end of the first mounting wall and the distal end of the first shuttling wall;

a radial distance between a point x and a point y is e, and an inner diameter of the first lumen is f, wherein e≥f, to eliminate the drop, so as to enable an instrument to enter the second lumen from the first lumen;

wherein the point x is a proximal end point of the first mounting wall, the point y is on a distal end portion of the second shuttling wall, and the point y is close to a proximal end of the tube body relative to the point x along an axial direction of the tube body;

wherein the distal end of the second shuttling wall is provided with a second notch communicated with the first lumen, the second notch is configured to face towards the first mounting wall, so as to enable the second notch to be communicated with the second lumen, and the point y is located in an area corresponding to the second notch.

17. The tube body according to claim 16, wherein the tube body comprises a metal mesh tube and a multi-lumen tube, and the multi-lumen tube is sheathed within the metal mesh tube.

18. The tube body according to claim 16, wherein the tip further comprises a third mounting wall and a fourth mounting wall, the first mounting wall, the second mounting wall, the third mounting wall and the fourth mounting wall are distributed along the radial direction of the tip, and a fourth lumen is formed between the third mounting wall and the fourth mounting wall;

the tube body further comprises a third shuttling wall and a fourth shuttling wall, the first shuttling wall, the second shuttling wall, the third shuttling wall and the fourth shuttling wall are distributed along the radial direction of the tube body, and a third lumen is formed between the third shuttling wall and the fourth shuttling wall;

a distal end of the third shuttling wall is configured to be butted with a proximal end of the third mounting wall, and a distal end of the fourth shuttling wall is configured to be butted with a proximal end of the fourth mounting wall, such that the third lumen is communicated with the fourth lumen;

wherein an inner diameter of the third lumen is smaller than an inner diameter of the fourth lumen, such that both the proximal end of the fourth mounting wall and the proximal end of the first mounting wall correspond between the first shuttling wall and the second shuttling wall.

19. A medical device, comprising the imaging catheter according to claim 1.

\* \* \* \* \*